United States Patent [19]
Feder

[11] 3,859,105

[45] Jan. 7, 1975

[54] STRUCTURAL ELEMENT AND A METHOD FOR MAKING SUCH ELEMENTS

[76] Inventor: Johann-George Feder, Wilhelm-Scharrelmann-Str. 2E, 2804 Lilienthal, Germany

[22] Filed: Feb. 7, 1973

[21] Appl. No.: 330,426

Related U.S. Application Data

[63] Continuation-in-part of Ser. No. 160,484, July 7, 1971, abandoned.

[52] U.S. Cl. ............................ 106/118, 106/120
[51] Int. Cl. ............................................ C04b 1/00
[58] Field of Search .......... 106/85, 89, 118, 120, 98

[56] References Cited
UNITED STATES PATENTS
852,500    5/1907    Elkus ................................. 106/120

Primary Examiner—J. Poer
Attorney, Agent, or Firm—Charles Hieken, Esq.; Jerry Cohen, Esq.

[57] ABSTRACT

The invention relates to the providing of a novel structural element made by hydrothermal hardening of mixtures of siliceous material, lime or cement as binding agent, water and a solidifying or addition agent consisting of barium carbonate to form a compound of barium sulfate with water-soluble sulfates which be included as impurities within said siliceous material.

12 Claims, 1 Drawing Figure

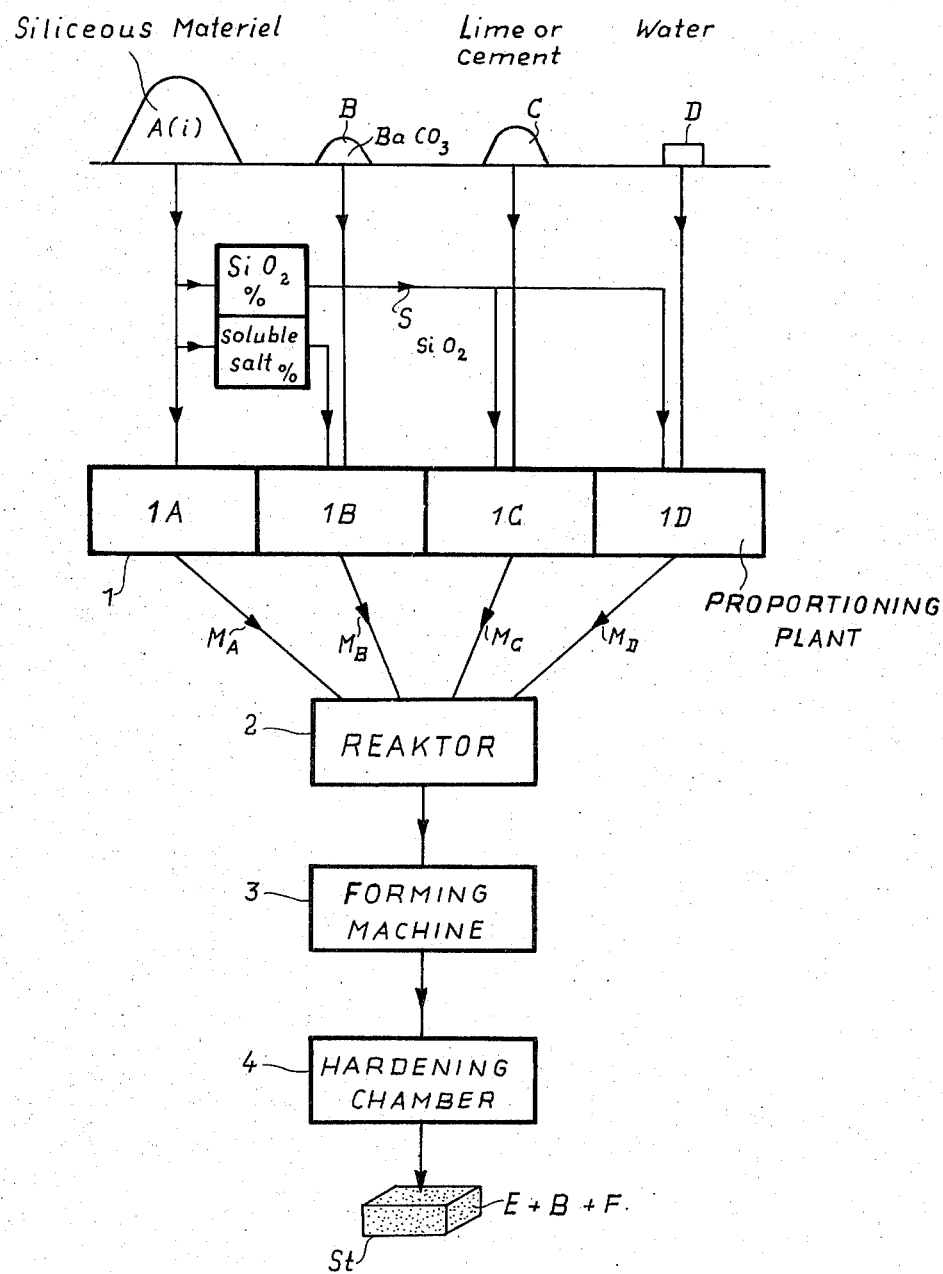

STRUCTURAL ELEMENT AND A METHOD FOR MAKING SUCH ELEMENTS

REFERENCE TO PRIOR COPENDING APPLICATION

This is a continuation-in-part of application Ser. No. 160,484, filed July 7, 1971, now abandoned.

This invention relates to the manufacture of structural elements by hardening mixtures of filling material, a binding agent and water.

The quality of lime or cement bonded bricks or structural elements made from a mixture of filling material, a binding agent and water hardening is highly dependent upon the nature and especially the purity of the materials used. It is of course desirable to utilize not only high-grade filling materials but any materials available such as naturally occurring sand or other filling materials and especially cheaply available materials as, for instance, silicon containing artificial by-products such as slags, rubbish from open cuts, waste products from flotation plants of iron works, foundries and mines.

Hitherto, the use of such impure filling material was possible only to a limited extent because the impurities within structural elements made of such materials are frequently subjected to atmospheric effects resulting in undesirable alterations of structure and appearance. These defects usually occur to a marked degree if highly water-soluble ingredients such as sulfates are included in said impurities.

Under the influence of atmospheric water entering the pores of the bricks from the outside of the building these sulfates are dissolved and emerge through the openings of the pores where the sulfates, after volatilization of the solution water, form efflorescences which give rise to ugly spots on the outside of the building, especially in coloured bricks. Inside the structural elements the inclusions of sulfates more or less disappear and will leave corresponding large pores which on their part will affect the strength and the insulating properties of the structural elements.

The above disadvantages can of course be avoided by eliminating the impurities from the filling material before manufacturing the structural elements. However, such elimination, which could be performed by washing out said water-soluble sulfates, would be so expensive that the utilization of such impure material would no longer be economically justifiable.

Therefore, it is an object of the present invention to provide an economic method to ensure a high stability of strength, appearance and freezeproofness of structural elements manufactured by hardening of mixtures of filling material with even high impurities consisting of or containing water soluble sulfates.

According to my German Pat. No. 1,917,249 barium carbonate is added as an auxiliary solidifying agent to convert the water soluble sulfates into barium sulfates which are insoluble in water.

The use of barium carbonate for the conversion of water soluble sulfates has long been known in the manufacture of bricks from brick clay by burning in brickkilns under application of high temperatures which are useful for the process of conversion into barium sulfates which are not soluble in water. However, this method has not been utilized in connection with the production of bricks other than clay bricks and especially not for the improvement of lime bricks, because the use of barium carbonate by such a method was considered to be not effectively applicable due to the quite different process employed in the manufacture of lime bricks in which hardening is effected under the action of pressure steam. Even by my invention covered by German Pat. No. 1,917,249 does not completely solve the problem by the addition of barium carbonate to siliceous filling materials including impurities in the form of water-soluble sulfates but only reduces the foregoing disadvantages to some extent.

I have now found that this somewhat unsatisfactory result is due to the fact that the addition of barium carbonate according to my prior German Patent was essentially in accordance with the stoichiometric law and accordingly the amount of barium carbonate added was 2.46 times as large as the amount of water soluble sulfate to be converted and in order successfully to convert all water soluble sulfates, the amount of barium carbonate to be added must considerably exceed the stoichiometric amount. Series of experiments have shown that unexpectedly high inequalities of distribution of water soluble ingredients may occur even after intensive mixture on account of a decomposition process which takes place within the structural element even in advance of and during the chemical conversion and is followed by a highly unequal distribution of water soluble sulfates and barium carbonate. This decomposition is especially caused by the inner flow process during the hydrothermal hardening of the structural elements which in factories for lime bricks is carried out within autoclaves by steam under pressure in excess of atmospheric pressure of for instance 4 to 16 atm. Moreover such decomposition is also dependent on the shape of the structural elements concerned.

Following the above realization of physical and chemical processes during and following the productions of structural elements from mixtures containing water soluble sulfates the special problem as pointed out above has been solved according to the invention in a more satisfying manner by addition of an ingredient of the mixture in the form of one or more chemically generated carbonate-products which are insoluble or difficultly soluble in water which or one of which is barium carbonate in an amount by weight including an essential excess above the stoichiometric amount.

It is thereby possible to obtain through conversion into water insoluble barium sulfates even in zones of outstandingly high concentration of water soluble sulfates. Barium carbonate having a good affinity to water soluble sulfates is available sufficiently at economical prices. Barium carbonate as well as barium sulfate resulting from the conversion are both insoluble in water. After manufacture, any surplus of barium carbonate remains within the structural element and is available, even in the building made from the structural elements, for conversion of any residual water soluble sulfates during their migration along the pores of the structural elements.

I have also found that yet another problem which is important especially in connection with use of lime as the binding agent is solved simultaneously by the aforesaid addition of the excess of barium carbonate, namely the problem of obtaining a satisfactory compressive strength of lime bounded structural elements under the influence of water, which strength is usually called "wet compressive strength." Experiments with structural elements made according to the method of the invention with the addition of an excess of barium carbonate have shown that an unexpected increase of compressive strength and freeze-proofness of such structural elements is obtained even if such elements are subjected to long periods of submersion in water which could not be obtained formerly. Moreover, the shrinkage of the bricks which occurs as a result of atmospheric conditions is substantially reduced and retarded by the addition of carbonates according to the invention. This improvement is no doubt due to the favourable influence of the stoichiometric surplus of barium carbonate on the stress properties of the binding zone within the structural element; the calcium-hydro-silicate-phase is transferred in a more stable form by barium carbonate which ensures an increased stability even under intensive influence of water and aggressive substances.

Therefore, besides the above discussed specific problem to obtain a conversion of all water soluble sulfates which, to a certain extent, are present within all available filling materials it is another object of the present invention to obtain a high wet compressive strength and freezeproofness especially of lime bounded structural elements.

In order satisfactorily to solve this general problem the stoichiometric excess of barium carbonate can be expressed as a given percentage by weight of the mixture or of one of the free eligible ingredients of the mixture.

Instead of using barium carbonate alone, other carbonates which are insoluble in water may be used as auxiliary component for improvement of the wet compressive strength, e.g. chemically generated calcium carbonate. However, also calcium carbonate from natural lime stone and dolomite may be used because the water soluble sulfates included in such raw materials may be included into the conversion by said barium carbonate. Thus it is possible to bring into full effect the high strength of such natural calcium carbonate raw materials which may be used instead of silicon materials.

In order more clearly to understand the method of manufacturing lime-bound bricks or other structural elements according to the invention, reference is made to the accompanying drawing which illustrates diagrammatically and by way of example a flow diagram of a preferred embodiment.

Filling material A, for example, siliceous material from a flotation plant of an iron works, with impurities containing a certain portion $M_{iA}$ of water soluble sulfates i is conveyed into a first unit 1A of a proportioning plant 1. A first auxiliary agent $B_1$, namely barium carbonate $BaCo_3$, which is a chemically generated carbonate product, is conveyed into a second unit $1D_1$ and a second auxiliary agent $B_2$, namely chemically generated calcium carbonate $CaCo_3$ into a third unit $1B_2$ of the proportioning plant 1.

A binding agent C, such as quick-lime CaO or slaked lime $Ca(OH)_2$, is fed into a fourth unit 1C and water D is fed into a fifth unit 1D.

The proportioning units 1A, $1B_1$, $1B_2$, 1C, 1D deliver amounts $M_A$, $M_{B1}$, $M_{B2}$, $M_C$, $M_D$ into a mixer and silo 2 which if receiving quicklime also act as a reactor. The mass coming from the silo 2 is fed to a press or other forming machine 3 to be brought into the form of the bricks or other structural elements St to be manufactured and the moulded elements leaving the forming machine 3 are brought into one of a plurality of hardening chambers 4 in which the moulded articles are subjected to a hydrothermal hardening process, preferably in an autoclave by steam under pressure in excess of atmospheric pressure and temperature about 100°C, for instance 16 atm, 207°C, during a period sufficient for hardening as for instance 4½ hours.

The first auxiliary component $B_1$ is primarily used for the conversion into barium sulfate F ($Ba SO_4$) of water soluble sulfates i which are included in the mixture especially in the filling material A by an amount $M_{iA}$, but may also be included in anyone of said other ingredients of the mixture e.g. in the second auxiliary component $B_2$ by an amount $M_{iB2}$, or the binding agent C by an amount $M_{iC}$ or in the water D by an amount $M_{iD}$.

In order to bind chemically all water soluble sulfates i of the mixture, an amount $M_{Bli}$ of barium carbonate $B_1$ is necessary which according to the stoichiometric rule is equal to 2,46-times the amount $M_i = M_{iA} + M_{iB2} + M_{iC} + M_{iD}$ of all water-soluble sulfates i. However, in order to obtain — notwithstanding the decomposition of barium carbonate $B_1$ and water soluble sulfates i under the influence of steam within the hardening chamber 4 during the hardening procedure — a practically complete conversion of all water-soluble sulfates i into water insoluble barium sulfate F according to the invention the amount $M_{B1}$ of barium carbonate is added with an excess $M_{B1+}$ over the stoichiometric amount, i.e. with a total amount equal to $M_{B1} = M_{Bli} + M_{B1+}$.

The amount of said stoichiometric excess $M_{B1+}$ is chosen as the circumstances require.

If the filling material A originates from natural sources the stoichiometric excess $M_{B1+}$ should be made at least 26 percent by weight of all water soluble sulfates included in said filling material because the sulfates then are more or less enclosed within the individual particles of the filling material. If, however, the sulfates are presnt in open form and therefore are better accessible to the composition with the barium carbonate then the stoichiometric excess $M_{B1+}$ may be reduced to 10 percent by weight of the effective amount $M_i$ of water soluble sulfates.

In order to ensure a complete conversion of all water-soluble sulfates into barium sulfate even if the stoichiometric excess is chosen near said lower limit of 25 percent and 10 percent respectively, it is firstly necessary to make available the stoichiometric portion $M_{Bli}$ corresponding to the real amount $M_i$ of water-soluble sulfates which may be effected by continuous or quasi continuous analysis of the filling material. Moreover, the mixture should be subjected to a very intensive mixing using high-grade mixers and a lengthy mixing operation.

If it is desired — which will generally be the case — not only to exclude the detrimental influences of water-soluble sulfates but simultaneously to increase the wet compressive strength and freezeproofness by the addition of chemically generated carbonates, this can be obtained by providing merely a corresponding increased stoichiometric excess $M_{B1+}$ of barium carbonate or a portion of the amount of carbonates which are not or are difficulty soluble in water and which portion is required for the increase of the wet compressive strength may be covered by the addition of calcium carbonate $CaCO_3$ so that the excess $M_{B1+}$ of barium carbonate can be correspondingly smaller and may be made a predetermined percentage by weight of the amount $M_i$ of water-soluble sulfates or just as the amount $M_{B2}$ of calcium carbonate may be made a predetermined percentage by weight of the dry mixture or of the dry filling material $M_A$. Calcium carbonate from chemical manufactures or from natural occurrence like lime stone or dolomite is much less expensive than barium carbonate and therefore may be added with good technical as well as economical result with a higher amount than barium carbonate as, for instance, an amount which is always higher than 1 percent and is preferably 3 to 5 percent by weight of the total amount $M_A$ of dry filling material A.

Considering that a high stoichiometric excess $M_{B1+}$ of barium carbonate is worthwhile on account of a reliable conversion of all water-soluble sulfates as well as a certain increase of wet compressive strength it is generally advantageous to choose the amount of barium carbonate, if utilized as sole auxiliary agent, by adjustment of unit $1B_1$ in such a manner that both following equations are satisfied:

a. $M_{B1} \geq 5 M_i$
b. $M_{B1} \geq 2,5 M_i + 1,25 M_A$

The determination of the average content $M_i$ of water-soluble sulfates is effected in an analyzing station 5. The dosing of the components $B_1$, $B_2$ in the proportioning plant is effected in dependence on the results of the analysis which may be made continuously during the manufacture or may be made by analysis of separate probes before the manufacture. Preferably the analysis is performed by measurement of the total amount of water soluble salts the portion of readily soluble sulfates being regularly approximately 10 percent of said total amount. Under this supposition, which can be subjected also to a different proportion, with the present example assuming a total amount of water salts equal to 1 percent of $M_A$, an amount $M_i$ to about 0.1 percent of $M_A$ will be in the mixture and therefore an amount $M_{B1} \geq 0.5$ e.g. 0.6 percent of amount $M_A$ may be delivered by unit $1B_1$ into silo 2. From equation (b) an amount $M_{B1} = 2.5 \times 0.1 + 1 \times 1.25 = 1.50$ percent so that an amount $M_{B1} = 1.50$ percent must be adjusted in order to satisfy both conditions (a) and (b).

For economical reasons the addition of barium carbonate may be restricted to an amount satisfying only equation (a), i.e. $M_{B1} = 5 M_i$ so that in the present example an amount of $M_{B1} = 0.5$ percent $M_A$ is provided in order to ensure conversion of all water soluble sulfates, whereas the required wet compressive strength may be reached by the additional use of chemically generated calcium carbonate as a second auxiliary component $B_2$ by adjustment of unit $1B_2$ between 3.0 to 5.0 percent by weight of that of the total dry filling material $M_A$.

In order to simplify and secure the realization of the required quality of the structural elements one may use a portion $M_{B1}$ of barium carbonate $B_1$ between 0.5 and 2.0 percent which is sufficiently high for any amounts of water soluble sulfates which may possibly occur under the respective circumstances, e.g. $M_{B1} = 1.25$ percent of $M_A$ and the amount of calcium carbonate may be more than 1.0 percent e.g. $M_{B2} = 3$ to 5 percent of $M_A$. This overall dosing should be applied wherever the higher consumption of barium carbonate is justifiable economically and where the satisfaction of equation (a) otherwise is uncertain let us say by high alterations of content $M_i$ of water-soluble sulfates or where the determination of this value for any reasons is difficult or uncertain.

The portions $M_C$ and $M_D$ are adjusted in the usual manner in accordance with the composition of the filling material A, e.g., the percentage of $SiO_2$ in the filling material, by maintaining a ratio of $SiO_2/CaO$ of 9 to 1. The adjustment of unit 1B may be effected by hand or automatically by a control signal $S_i$.

The aforedescribed steps of proportioning, mixing and reaction, forming and hardening may be performed in any known manner, and also the techniques and means for transmitting the separate components A, $B_1$, $B_2$, C, D to the silo 2 are well known. Beginning during the mixing process within silo 2 and continued primarily during the hardening process, chemical conversions take place such as a conversion of siliceous material A together with lime C and water D into compounds E and a conversion of water soluble sulfates $i$ together with a stoichiometric amount of barium carbonate $B_1$ into water insoluble barium sulfate F. Water D in excess is driven out by evaporation. The excess $M_{B1+}$ of barium carbonate $B_1$ which is not subjected to conversion into barium sulfate F represents an ingredient which substantially contributes to the strength and freezeproofness of the structural element as hereinbefore mentioned.

Other filling materials may be used for the manufacture of structural elements according to the invention, e.g., rubbish from open cuts, slags and other waste products from flotation plants, plants for production of precious metals or nonferrous metals in which natural material originally not effected are effected by water-soluble sulfates during the production.

Even natural sands of high quality or other filling materials of high purity regularly show a certain though small content of water-soluble sulfate which may not give rise to efflorescenses but in any case will impair the wet compressive strength and freezeproofness of lime bricks to such a degree that even lime bricks made from such high quality materials hitherto could not be utilized as face bricks for satisfying strict requirements. Hitherto lime bricks were utilized predominently for inside walls and would only scarcely be admitted as face bricks for outside walls. It is therefore an important advantage of the invention to have improved the quality of lime bricks to such a degree that they now can be used as face bricks for high demands so that the field of application by the present invention has been considerably widened.

Whenever filling materials with a very high content of water-soluble sulfate occur, it may be possible to reduce the percentage content by mixing it with a filling material of lower content of water-soluble sulfate thereby reducing the amount of barium carbonate required.

When using a silocon-poor filling material it is convenient to use cement instead of lime as binding agent. In the latter case the hardening process could be performed in the open air, however, the application of super pressure steam for hardening under a pressure of 4, 8 or 16 atm. is important to ensure a quick and satisfying conversion of water-soluble sulfates and especially to obtain a high wet compressive strength also in connection with cement as binding agent.

Where barium carbonate is not available at reasonable prices other barium containing ingredients having a good affinity to barium sulfates e.g., barium hydroxyde may be used alone or in addition to barium carbonate for the chemical combination with water soluble sulfates. Although barium hydroxide is soluble in water its degree of solubility, however, is far below that of water soluble sulfates and therefore can also be successfully used for improvement of structural elements in the sense of the present invention. Barium carbonate, however, is preferred for its better suitability for the present purposes.

I claim:

1. In a method of making structural elements by hardening a mixture of filling material, a binding agent, and water wherein the hardening is carried out in a conventional manner in an autoclave by steam under pressure in excess of atmospheric pressure and at a temperature above 100°C, the addition of at least one solidifying auxiliary agent to the mixture in the form of chemically generated carbonate-products which are insoluble or difficultly soluble in water and which at least includes barium carbonate, the improvement of freezerproofness and high wet compressive strength comprising the addition of said barium carbonate in an amount necessary for conversion of all water-soluble sulfates of the mixture into water insoluble sulfates, wherein the stoichiometric excess of barium carbonate is 0.5 to 2.0 percent by weight of the dry filling material and at least is 10 percent the weight of the average of water soluble sulfates included in said mixture.

2. A method in accordance with claim 1 wherein said stoichiometric excess of barium carbonate is substantially 1.25 percent by weight of the dry filling material and substantially 2.5 times the weight of the average of water soluble sulfates included in said mixture.

3. A method in accordance with claim 1 wherein the amount of barium carbonate is at least 1.5 percent by weight of the dry filling material.

4. A method in accordance with claim 1 wherein said chemically generated carbonate-products include calcium carbonate in an amount that is more than 1.0 percent by weight of the dry filling material.

5. A method in accordance with claim 4 wherein the amount of said calcium carbonate is 3.0 to 5.0 percent by weight of the dry filling material.

6. A method in accordance with claim 1 wherein the chemically generated carbonate added includes at least calcium carbonate in an amount greater than 1.0 percent by weight of the total dry filling material in addition to the stoichiometric amount of barium carbonate.

7. A method in accordance with claim 6 wherein the calcium carbonate added is in an amount that is 3.0 to 5.0 percent by weight of the total dry filling material in addition to the stoichiometric amount of barium carbonate.

8. A method in accordance with claim 1 wherein said filling material is siliceous sands from natural sources.

9. A method in accordance with claim 8 wherein said siliceous materials are substantially free from water soluble sulfates.

10. A method in accordance with claim 1 wherein the auxiliary agent consists of naturally occurring carbonate material.

11. A method in accordance with claim 10 wherein the auxiliary agent includes natural calcium carbonate raw materials.

12. A method in accordance with claim 10 wherein the auxiliary agent includes natural calcium-carbonate/magnesium-carbonate raw materials.

* * * * *